United States Patent [19]

Anderson

[11] 4,176,585

[45] Dec. 4, 1979

[54] UNIVERSAL PANOGRAPH PATTERN

[75] Inventor: Rodney L. Anderson, Fullerton, Calif.

[73] Assignee: Creative Tool Specialties, Inc., Balboa Island, Calif.

[21] Appl. No.: 834,062

[22] Filed: Sep. 16, 1977

[51] Int. Cl.[2] .......................................... B23Q 35/44
[52] U.S. Cl. ...................................... 409/125; 33/26; 409/87
[58] Field of Search .............. 90/13.1, 62 R; 33/23 K, 33/26

[56] References Cited

U.S. PATENT DOCUMENTS

| 2,409,290 | 10/1946 | Lipp | 33/26 |
| 3,263,333 | 8/1966 | Bell | 33/23 K |

FOREIGN PATENT DOCUMENTS

| 156300 | 3/1964 | U.S.S.R. | 33/23 K |

*Primary Examiner*—Gil Weidenfeld
*Attorney, Agent, or Firm*—George F. Bethel; Patience K. Bethel

[57] ABSTRACT

The following specification discloses a universal guide or pattern for use with a panograph. The panograph can comprise a number of arms that are interconnected at hinge points that support a spindle having a cutting tool for milling or cutting a circular, ornate, or eccentric shape, as well as angles and lines. The spindle with the cutter correspondingly follows the movement of a stylus that overlies the universal pattern that is formed with an arm that guides the stylus in either a two or three dimensional pattern. The pattern is formed in part on a plate having a centrally oriented pin or support post that holds a rotatable arm having a scale thereon. The rotatable arm has a pair of stops that can be set along its length at different locations with respect to the scale. The panograph stylus can be implaced within a stylus holder that moves along the arm between the stops or within the stylus holder that is secured by a set screw. The base plate is provided with a number of various angularly oriented openings so that the arm can be turned to the different angles and locked in the openings. Thus, the different angles of the holes formed on the plate, as well as the different radial locations of the arm and the stylus holder provide whatever conformation is desired on the work. In this manner, the stylus can move in a pattern that is pre-established with respect to a number of various movements without the requirement of a specific pattern for each particular conformation that is to be milled or cut.

2 Claims, 9 Drawing Figures

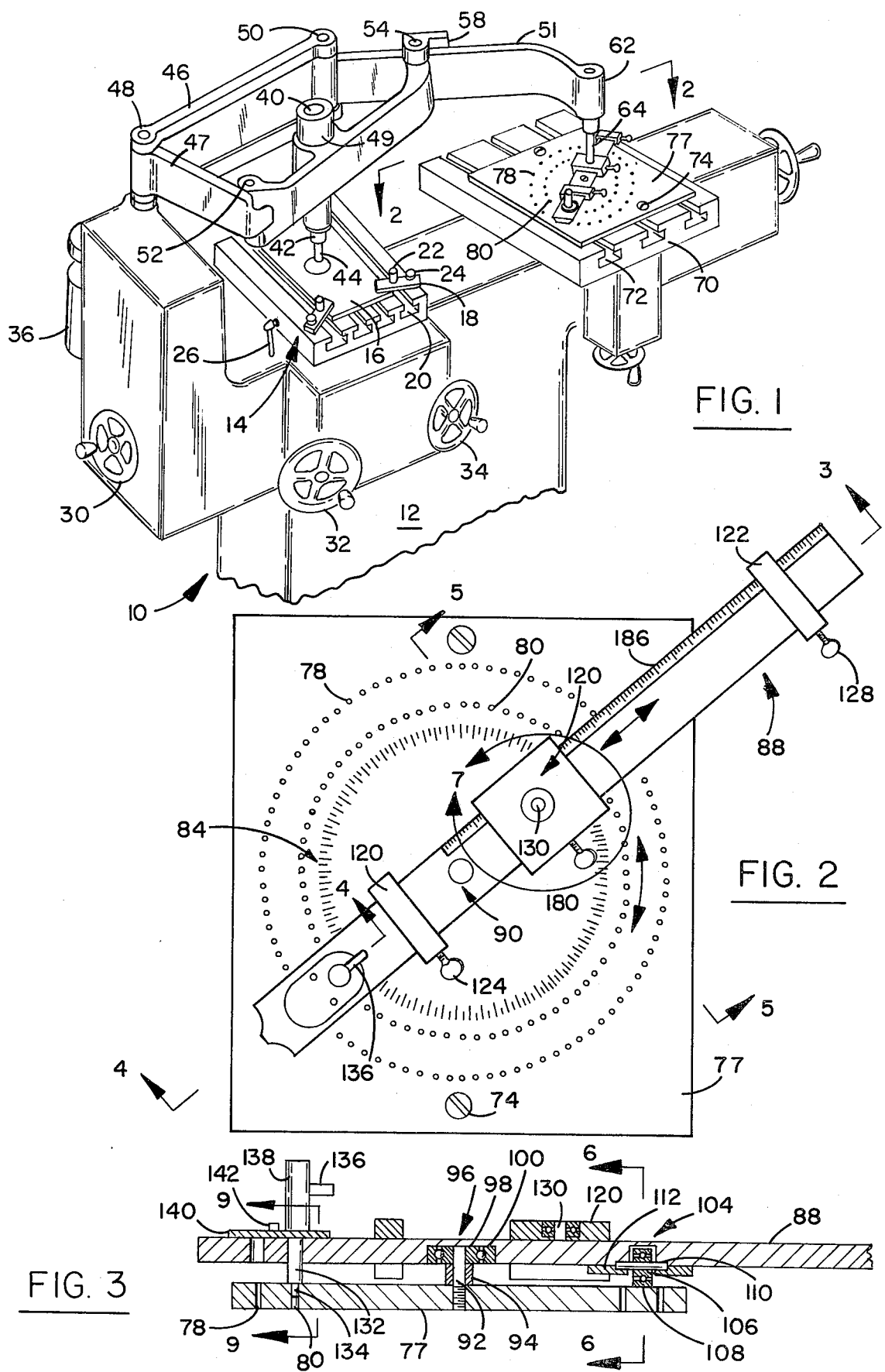

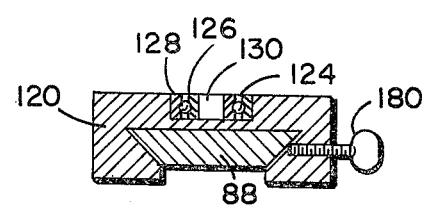
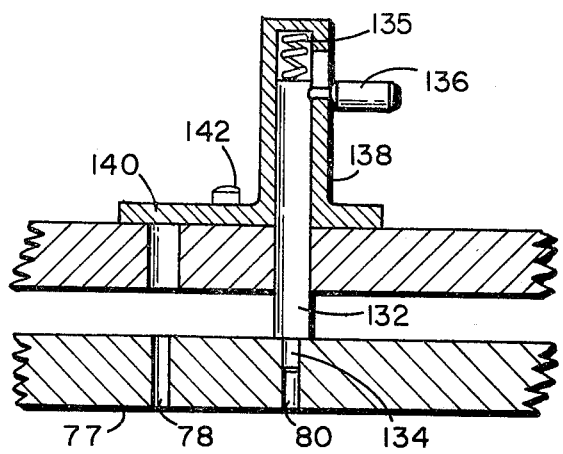
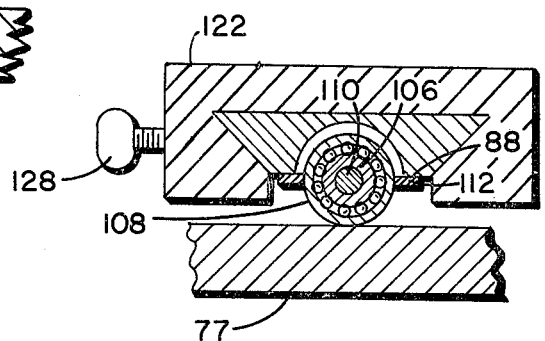
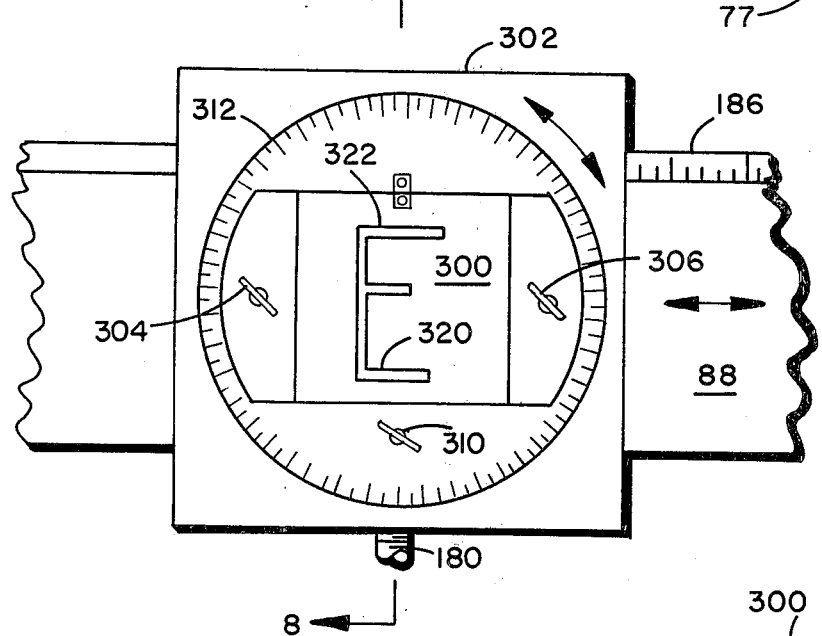
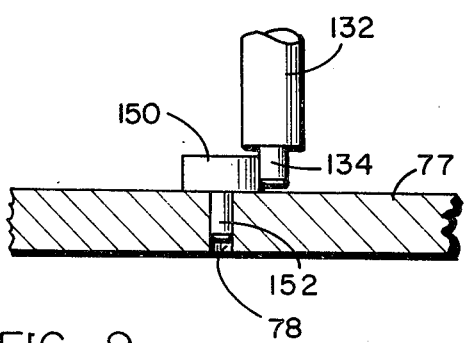
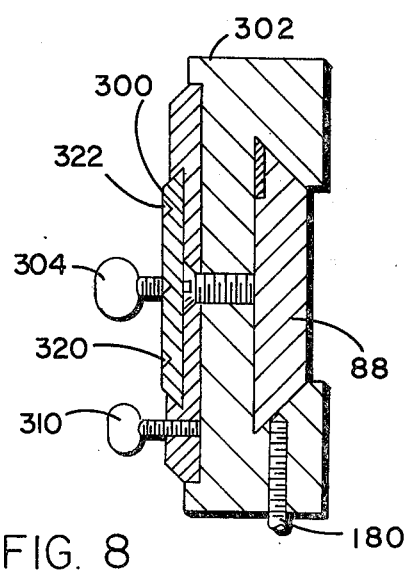

UNIVERSAL PANOGRAPH PATTERN

BACKGROUND OF THE INVENTION

1. Field of the Invention

The field of this invention lies within the machine tool art. In particular, it lies within the art of using a panograph for a cutter or mill wherein a pattern is utilized for cutting a piece of work in a following manner. The field can be further limited to the aspects of a pattern for a panograph.

2. The Prior Art

Panographs have been used over the years for evolving a design within a workpiece by means of following a pattern. In particular, a pattern is established wherein a stylus can be moved over the pattern to drive a group of follower arms and the cutting tool in response thereto. The follower arms support a cutting head that is driven over a piece of work that is to be cut or milled. Generally, the movement of the cutting head can be on a ratio established by the length of the arms and their relative location with respect to each other. The panograph can be utilized in any particular mode, so long as it functions to cause the cutting of the workpiece in response to the movement of the stylus over a pattern.

Previously, two and three dimensional patterns have been used for cutting dials, letters, coins, medals, and variously shaped configurations, such as signs and three dimensional metal pieces. During the cutting process, it was customary to provide a pattern for the panograph which had to be previously established and cut as a workpiece by hand.

In making the pattern, certain curves can be utilized, as well as shapes to be established by the pattern. Oftentimes, common curves of various arcs of radius and configurations are utilized, as well as circles. Again, it is common to use letters and patterns of various circular configurations, as well as angles, all having common surfaces which are to be incorporated in the pattern and then into the workpiece.

The foregoing pre-established patterns are expensive to manufacture, difficult to maintain, and time consuming in their use. This is due to the fact that the patterns have to be changed periodically on the panograph support table and furthermore, a pre-established pattern has to be formed with regard to the conformation or pattern that is to be established in the work. As can be appreciated, when common curves, angles, and various curves having different arcuate effects are utilized, it would be easier to have one universal pattern to work from.

This invention provides a universal pattern for circles, angles, an other scribed lines, as well as configurations having various eccentricities and straight or angular lines.

The invention further enables the utilization of a universal pattern established by the various angular radii and swinging arm of the invention in both eccentric and concentric relationships. It allows the stylus of a panograph to be implaced at various radii from a central location and rotated on an arm around that central location to provide an arc or a full circular conformation for the cutting tool. In addition thereto, the arm can be locked at various angles and held for movement of the stylus up and down the axis of the arm to provide angular movement to the cutting head.

In addition to the foregoing features, a scale can be utilized with the arm in order to allow the cutting head to be moved over the work in a discretely measured manner. Additionally, a series of stops are utilized so that after one cut has been made, a series of cuts can be made utilizing the original location for the movement of the stylus, In addition to the foregoing features, the slide bars or arms of the panograph can be moved into different proportionate relationships for purposes of providing concentric as well as eccentric movements when the stylus is moved in the universal pattern along the arm. In this manner, eccentricities as well as concentricities can be cut into a piece of work to establish various configurations without the use of a custom pattern in each instance.

From the foregoing, it can be seen that this invention provides a universal movement for a pattern which can move the cutting head of a panograph in various manners to accommodate a number of different configurations. This is done without the utilization of a custom pattern, as will be seen from the following specification, it is a substantial step over the art as exemplified and practiced in accordance with the specification hereof.

SUMMARY OF THE INVENTION

In summation, this invention comprises a universal pattern for providing circles and angles, as well as concentric and eccentric arcs to move a series of panograph arms with a cutting head over a workpiece.

More particularly, the invention comprises a series of panograph arms in cooperation with a universal pattern for purposes of cutting angles, lines, and circular configurations, as well as letters in either an eccentric or concentric manner. The panograph arms are driven by a stylus which is incorporated on one end of the arms and seated within a bearing or journal of a stylus holder. The stylus holder is connected to an arm that is moved around a central axis on a plate. The plate has a plurality of angularly spaced openings therein to which the arm can be locked into. This provides movement of the stylus along a given angular direction. The angular direction can be at any particular angle as established by the holes in the plate.

The stylus holder can be moved axially along the arm, or be locked along the arm so that it can rotate with the arm around the central axis to which the arm is connected. Additionally, a pair of stops can be provided so that the stylus holder can be moved along the arm to discrete locations within certain ranges for purposes of providing specified angular movement on a pre-established basis. As a consequence of the foregoing, the invention incorporates a stylus holder or panograph that provides configurations in the form of circles, lines, or other shapes on a pre-established basis through the use of a universal pattern.

BRIEF DESCRIPTION OF THE DRAWINGS

The invention will be more clearly understood by reference to the description below taken in conjunction with the accompanying drawings wherein:

FIG. 1 is a perspective view of a panograph with the universal pattern attached to the stylus table thereof;

FIG. 2 shows a plan view of the universal pattern of this invention in the direction of lines 2—2 of FIG. 1;

FIG. 3 shows a sectional view of the universal pattern of this invention as established in the direction of lines 3—3 of FIG. 2;

FIG. 4 shows a fragmented sectional view of the locking mechanism between the arm and the plate of this invention in the direction of lines 4—4 of FIG. 2;

FIG. 5 shows a sectional view of the stylus holder of this invention as sectioned along lines 5—5 of FIG. 2;

FIG. 6 shows a sectional view of the bearing support means for the arm of this invention as sectioned along lines 6—6 of FIG. 3;

FIG. 7 shows an alternative plan view of a letter holding stylus holder of this invention that would be an alternative view of encircled by circle 7 of FIG. 2;

FIG. 8 shows a sectional view of the alternative stylus holder as sectioned along lines 8—8 of FIG. 7; and, FIG. 9 shows a sectional view of the locking means of this invention in the direction of lines 9—9 of FIG. 3.

DESCRIPTION OF THE PREFERRED EMBODIMENTS

Looking more particularly at FIG. 1 and the figures that are ancillary thereto, it can be seen that a panograph 10 is shown having a base or pedestal 12. The panograph 10 incorporates a work table 14 upon which a workpiece 16 that is to be cut is held in place.

The workpiece 16 is secured by means of clamps 18. The clamps 18 engage a T slot 20 in the table and are fundamentally such that they are held by inverted T members 22 that can be tightened by moving a screw 24 against the surface of the table 14. In this manner, the workpiece 16 can be secured to the table 14.

A lever 26 is utilized to lock the table in place. In order to move the table, a number of wheels are utilized to provide feed to the table. A lateral feed wheel 30 is provided and a vertical feed wheel 34. In order to move the table axially, another feed wheel 34 is shown.

The entire panograph can be driven by a motor 36 that provides a belt or other suitable drive to a spindle 40.

Attached to the spindle 40 is a collet 42 with a cutting head 44 connected thereto. The entire unit can be used to cut the opening as seen in the workpiece 16.

The panograph fundamentally operates on a follower basis, whereby a number of arms or slide bars 46 are provided. The slide bars or arms 46, 47, 49 and 51 are coupled at pivotal connection points 48, 50, 52 and 54. In this manner, a rhomboidal movement is established.

The slide bars move with respect to each other and can be clamped to provide different ratios by varying the distance between connection points 48, 50, 52 and 54. In other words, it is generally customary to move the pattern end of the panograph with the stylus and have a ratio of movement with respect to the cutting head 44. Thus, various ratios of movement between the pattern and spindle 42 can be provided, depending upon how the arms are moved with respect to their hinge points.

The arms 46 shown connected at their different hinge points, such as at hinge point 54, move through a clamping means 58 which allows the bar 51 forming one of the slide bars to move inwardly and outwardly, thus expanding or contracting the rhomboidal configuration. In this manner, the ratio of movement is established thereby.

Slide bar 51 supports a stylus holder 62 with a stylus 64 connected thereto. The stylus 64 is usually a stylus with a pointed end that moves over a given pattern or within a letter configuration or over a three dimensional surface to provide a following type of movement to the cutter head 44.

A table 70 on which the pattern is implaced, is provided with a plurality of T slots 72. The slot can receive any T shaped clamps. However, in this case they are shown receiving screws 74 having T extensions therein. The T extensions help to lock a template table 77 that in this case provides a universal pattern.

The template table that provides the universal pattern has a series of radially spaced holes 78 and 80. The outer holes 78 are radially spaced around the template table at 3.6 degree intervals, thereby providing one hundred holes around the circumference. The inner holes 80 are at five degree increments and number seventy two.

The holes can be substituted by stops or other means in order to lock the operative elements of the invention into position on the template as will be described hereinafter. In order to provide for variable spacings between the holes 78 and 80, a button or pin can be implaced in the holes, so that a one or two degree difference can be used as a stop between the two holes.

An engraved set of calibrations 84 are shown on the plate 77 within the inner circumference of the set of holes 80. However, the calibrations 84 can be implaced at any location around the circumference of the template table and are only desired in order to locate the relative angle of the respective holes 78 and 80.

In order to provide the movement of the stylus, an arm 88 is shown. The arm 88 is supported at a central axis point 90 by means of a screw 92 that threads into the plate 77. The template table 77 receives the screw 92 threaded therein and a journal support 94 for holding a ballbearing 96 having an inner race 98 and an outer race 100. The inner race is secured to the screw 92, while the outer race 100 is secured to the arm 88 and allows the arm to rotate freely around the screw 92.

The screw 92 can be any central supporting axial member which allows the arm 88 to rotate around a central axis 90.

The arm 88 is supported distally from the axis 90 by a roller 104 which is in effect an inner race 106 and an outer race 108 of a ballbearing supported on a pin 110 which is secured on a plate 112 to the arm 88. The arm 88 has an inner axially oriented stop 120 and an outer stop 122 that are fundamentally sliding sleeves. The sliding sleeves 120 and 122 can be substituted by any other suitable configuration of a stop as will be described hereinafter. The stops 120 and 122 respectively receive thumb screws 124 and 128 threaded therein to tighten them down against the side of the arm 88. The cross section of the arm 88 forms a truncated sloping sided configuration, such as in a section of a truncated prism. However, the arm can be of any suitable configuration having a square, rectangular, or round configuration, so long as it provides the support function necessary to hold the stylus 64 as described hereinafter.

The stylus 64 is held within a stylus holder 120 having a stylus journal 124 comprising an inner race 126 and an outer race 128 of a ballbearing. The stylus is received within the opening of a journal 130 of the inner race and allows the stylus 64 to move freely within the stylus holder 120 as the arm 88 is moved about its axis.

In order to lock the arm 88 in the different respective locations, a spring loaded pin 132 is shown having a reduced portion 134 which seats within one of the openings 78 or 80 that comprise the respective angular or radial locations at which the arm 88 can be moved. The latch pin 132 is operated by a handle 136. The handle 136 moves upwardly and downwardly to permit a movement of the pin 132 in and out of the openings 78 and 80 and is biased by a spring 135.

The handle 136 is supported within a tubular member 138 which is secured to the arm 88 by a mounting plate 140 having a screw or rivet 142 attached thereto.

The respective location of the pin 132 within the openings 78 or 80 does no always provide an orientation that is less or an increment of the 3.6 degree or five degree variable locations of the openings. Although a major range of arm movements falls within the foregoing arcuate ranges, nevertheless, it is advisable to have more discrete orientations for holding the arm 88 which can be provided by the two foregoing ranges.

The plurality of ranges can be provided by having angular orientations established from one degree up to five degree circumferential orientations of the holes, such as holes 78 and 80. However, for purposes of convenience and in order to limit the amount of holes within the plate 77, it has been found that a button or stop as previously alluded to can be inserted into the plate 77.

Looking more particularly at FIG. 9, it can be seen wherein a button 150 having a diminished end 152 has been inserted within an opening, such as opening 78 to allow for the diminished end 134 of the pin 132 to rest against and provide the stop. The stop can be formed by a plurality of buttons or blocks on either side of the diminished end 134 of the pin 132 to lock it in place. Thus, it can be seen that the arm 88 can be moved discretely within the lesser limitations than the 3.6 and five degree radially oriented holes 78 and 80.

The stylus holder or sleeve 120 can be locked in place by means of a thumb screw 180 that secures it to the arm 88. The stylus holder 120 can be moved along a graduated scale 186, that can be established in any particular ratio to the workpiece 16 that is to be cut, or can be a direct scale. The orientation of the arm 88 can be moved and viewed with respect to the scale 84 by either providing an opening through which the radial graduations can be viewed, or other means can be utilized for viewing the graduations 84.

Looking more particularly at FIGS. 7 and 8, an alternative to the stylus holder 120 is shown for lettering purposes. In particular, a lettering stencil 300 is shown implaced within a letter holder 302 that is analogous to the stylus holder 120. The letter holder 302 incorporates a pair of thumb screws 304 and 306 that serve to secure the lettering pattern 300 therein. In addition thereto, the lettering pattern 300 can be rotated by relieving a locking thumb screw 310 so that the pattern 300 can rotate over the letter holder 302. The rotation can be graduated by a calibrated rotational series of graduations 312 so that the letter 300 can be rotated to various angles for inscribing a dial face. This is particularly handy when a dial face must be inscribed through the stylus 64 moving over a letter at an angle when the relative angle of the arm 88 has been turned to a particular angle and the letter is to be at a different angle.

The letter pattern 300 of course has grooves 320 and 322 that represent the horizontal portions of the letter E shown in FIGS. 7 and 8. Of course, any particular letter, pattern, or other configuration can be implemented within the letter holder 302 so that a rotational movement of the pattern 300 can be oriented with respect to the arm 88 for purposes of changing the orientation therein.

As can be seen from the foregoing description, this invention is a pioneering step with regard to panograph patterns that are pre-established with variable movements of the stylus. The variable movement stylus patterns can be configured to provide variable ratios, such as in the showing of FIGS. 7 and 8 between the arm and the pattern itself mounted on the arm. Furthermore, the rotation of the stylus holder 120 on the arm provides for various radial relationships of circles or curves that are to be cut.

In addition thereto, the slide bars or arms 46 that provide the follower movement to the stylus for moving the cutting head, can be oriented to provide eccentric movement. As a consequence, this invention is a substantial step over the art for providing concentric relationships, eccentric relationships and various angles and lines in cooperation with the foregoing, when utilized with the panograph. Thus, the invention should only be read broadly in light of the following claims which describe the invention as to the full scope and spirit thereof.

I claim:

1. A variable pattern for guiding a stylus on a pantograph along a preselected path comprising:
a plate for attachment to a table on a pantograph, an elongated arm having pivot means intermediate the ends thereof, said pivot means connecting said arm to the plate for movement about the axis of said pivot means, said plate including a plurality of index means spaced apart a predetermined distance in a circular pattern concentric with the axis of said pivot means, engagement means supported on said arm and being engagable with the index means for positioning the arm at a selected one of said index means, stylus holder means being slidably supported on said arms for movement along the length thereof, limit means slidably supported on said arm on each side of said stylus holder means, each of said limit means being releasably fixable along said arm for limiting the travel of the stylus holder means therealong, roller bearing means mounted on said arm and spaced from said pivot means and in engagement with said plate for supporting the arm on the plate, and said stylus holder means having bearing means for receiving a stylus and allowing the stylus to move freely therein relative to the stylus holder means.

2. The variable pattern as claimed in claim 1 including means for securing said plate to the table of the pantograph.

* * * * *